US010236673B2

(12) United States Patent
Kumar et al.

(10) Patent No.: US 10,236,673 B2
(45) Date of Patent: Mar. 19, 2019

(54) COVER ASSEMBLIES FOR CABLES AND ELECTRICAL CONNECTIONS AND PRE-EXPANDED UNITS AND METHODS INCLUDING SAME

(71) Applicant: TE Connectivity Corporation, Berwyn, PA (US)

(72) Inventors: Senthil A. Kumar, Morrisville, NC (US); Edward O'Sullivan, Cary, NC (US); Mahmoud K. Seraj, Apex, NC (US); Ganpathy Iyer, Cary, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 15/722,507

(22) Filed: Oct. 2, 2017

(65) Prior Publication Data
US 2018/0131172 A1 May 10, 2018

Related U.S. Application Data

(60) Provisional application No. 62/417,460, filed on Nov. 4, 2016.

(51) Int. Cl.
*H02G 15/18* (2006.01)
*H02G 15/192* (2006.01)
(Continued)

(52) U.S. Cl.
CPC ....... *H02G 15/1833* (2013.01); *H02G 15/192* (2013.01); *H01R 4/70* (2013.01); *H02G 1/14* (2013.01)

(58) Field of Classification Search
CPC .... H02G 15/1833; H02G 15/192; H02G 1/14; H01R 4/70
(Continued)

(56) References Cited

U.S. PATENT DOCUMENTS 3,163,707 A   12/1964   Darling
3,475,719 A   10/1969   Akin et al.
(Continued)

OTHER PUBLICATIONS

"CSJA In-line Cold Shrinkable Joints for 1/C Shielded Power Cables (15-35kV)" Tyco Electronics (2 pages) (2006/2007).
(Continued)

*Primary Examiner* — Dhiru R Patel
(74) *Attorney, Agent, or Firm* — Myers Bigel, P.A.

(57) ABSTRACT

An integral, unitary pre-expanded cover assembly unit for covering an electrical connection between first and second electrical cables each having a primary conductor and a sleeve defines a cable passage to receive the electrical connection and the primary conductors of the first and second cables. The outer sleeve surrounds the inner sleeve. The duct is neutral conductor includes a cover assembly and a removable holdout. The cover assembly includes an elastomeric inner sleeve, an elastomeric outer sleeve, and a duct. The inner interposed radially between the inner and outer sleeves. The duct defines a duct passage configured to receive at least one of the neutral conductors therethrough. The holdout is mounted within the inner sleeve. The holdout is operative to temporarily maintain the inner sleeve in an expanded state and the outer sleeve in an expanded state. The duct is flexible. The duct is operative to resist radial collapse of the duct and to bend radially inwardly as the holdout is axially removed from the inner sleeve.

24 Claims, 16 Drawing Sheets

(51) Int. Cl.
*H01R 4/70* (2006.01)
*H02G 1/14* (2006.01)

(58) Field of Classification Search
USPC .................................................. 174/68.3
See application file for complete search history.

(56) References Cited

U.S. PATENT DOCUMENTS

| | | | |
|---|---|---|---|
| 3,689,114 A * | 9/1972 | Meserole | F16L 13/103 |
| | | | 285/21.2 |
| 4,601,529 A | 7/1986 | Billet | |
| 5,233,363 A | 8/1993 | Yarsunas et al. | |
| 5,286,220 A | 2/1994 | Watson | |
| 5,315,063 A | 5/1994 | Auclair | |
| 5,577,926 A | 11/1996 | Cox | |
| 5,740,583 A | 4/1998 | Shimada et al. | |
| 5,844,170 A | 12/1998 | Chor et al. | |
| 6,364,677 B1 | 4/2002 | Nysveen et al. | |
| 7,182,617 B1 | 2/2007 | Cairns et al. | |
| 7,264,494 B2 | 9/2007 | Kennedy et al. | |
| 7,476,114 B1 | 1/2009 | Contreras | |
| 7,728,227 B2 | 6/2010 | Portas et al. | |
| 7,858,883 B2 | 12/2010 | Seraj et al. | |
| 8,030,570 B2 | 10/2011 | Seraj et al. | |
| 8,205,911 B2 | 6/2012 | Cordes et al. | |
| 9,184,576 B2 | 11/2015 | Vallauri et al. | |
| 9,202,612 B2 | 12/2015 | Hernandez et al. | |
| 9,224,519 B2 | 12/2015 | McLaughlin et al. | |
| 9,224,522 B2 | 12/2015 | Yaworski et al. | |
| 9,960,576 B2 * | 5/2018 | Chuang | H02G 1/14 |
| 2005/0269124 A1 | 12/2005 | Suzuki et al. | |
| 2007/0293087 A1 | 12/2007 | Kennedy et al. | |
| 2008/0143097 A1 | 6/2008 | Canale | |
| 2009/0181583 A1 | 7/2009 | Krabs | |
| 2010/0012350 A1 | 1/2010 | Hardi et al. | |
| 2010/0279542 A1 | 11/2010 | Seraj et al. | |
| 2017/0310093 A1 | 10/2017 | Chuang | |
| 2017/0317481 A1 | 11/2017 | O'Sullivan | |

OTHER PUBLICATIONS

"CSJA Cold Shrinkable 'All-In-One' Straight Joint for Polymeric Insulated Cables Up to 42 kV" Tyco Electronics EPP 1348 (4 pages) (Jul. 2007).

* cited by examiner

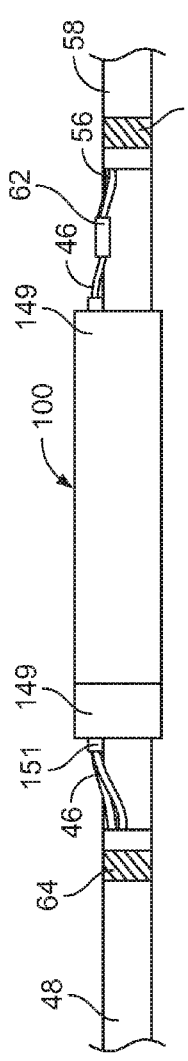
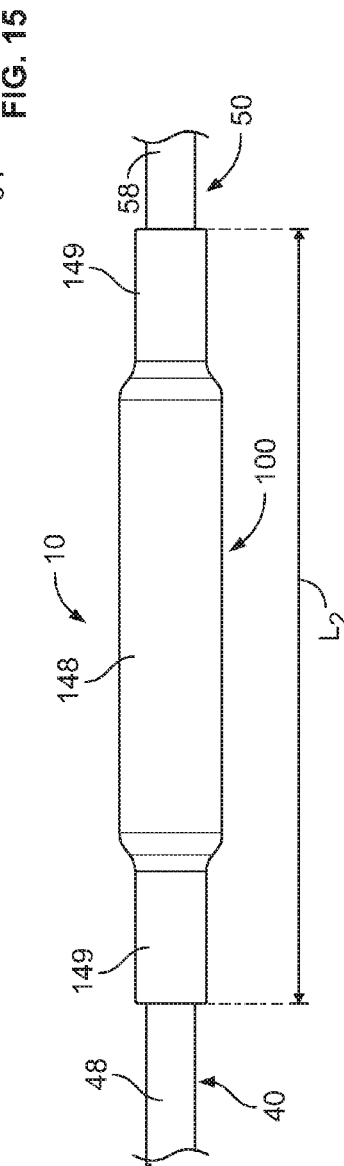
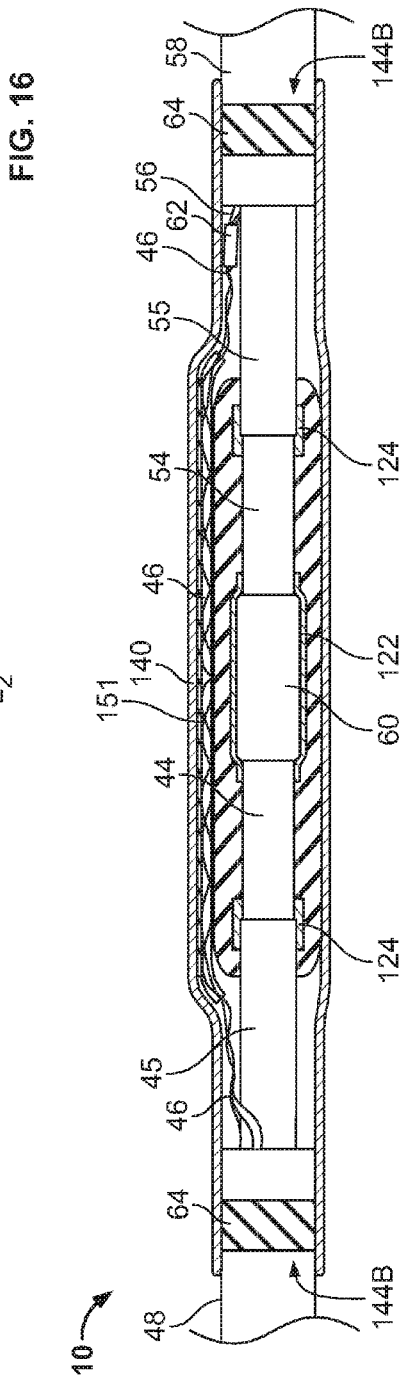
FIG. 15
FIG. 16
FIG. 17

COVER ASSEMBLIES FOR CABLES AND ELECTRICAL CONNECTIONS AND PRE-EXPANDED UNITS AND METHODS INCLUDING SAME

RELATED APPLICATION(S)

The present application claims the benefit of and priority from U.S. Provisional Patent Application No. 62/417,460, filed Nov. 4, 2016, the disclosure of which is incorporated herein by reference in its entirety.

FIELD OF THE INVENTION

The present invention relates to electrical cables and connections and, more particularly, to protective covers for electrical cables and electrical connections.

BACKGROUND OF THE INVENTION

Cold shrinkable covers are commonly employed to protect or shield electrical power cables and connections (e.g., low voltage cables up to about 1000 V and medium voltage cables up to about 46 kV). One application for such covers is for splice connections between concentric neutral cables. A concentric neutral cable typically includes at least one primary conductor surrounded by a polymeric insulation layer, a conductive layer, one or more neutral conductors surrounding the conductive layer, and a polymeric jacket surrounding the neutral conductors. Examples of cold shrinkable covers for use with concentric neutral cables include the "All-in-One" CSJA Cold Shrinkable joint, available from TE Connectivity, which includes an integral neutral conductor mesh. It is also known to cover splices between concentric neutral cables using a cold shrink elastomeric cover tube (such as the CSJ product, a plastic closure for sealing and protecting electrical cable, available from TE Connectivity) in combination with a separate re-jacketing cover (such as the GelWrap™ cover product, available from TE Connectivity). In this case, the cold shrink tube is installed over the primary conductors and the insulation layers, the neutral conductors are laid over the cold shrink tube, and the re-jacketing cover is subsequently wrapped around the neutral conductors and the insulation layer. Each of these known methods may suffer from problems or limitations in performance and/or installation.

SUMMARY OF THE INVENTION

According to some embodiments, an integral, unitary pre-expanded cover assembly unit for covering an electrical connection between first and second electrical cables each having a primary conductor and a neutral conductor includes a cover assembly and a removable holdout. The cover assembly includes an elastomeric inner sleeve, an elastomeric outer sleeve, and a duct. The inner sleeve defines a cable passage to receive the electrical connection and the primary conductors of the first and second cables. The outer sleeve surrounds the inner sleeve. The duct is interposed radially between the inner and outer sleeves. The duct defines a duct passage configured to receive at least one of the neutral conductors therethrough. The holdout is mounted within the inner sleeve. The holdout is operative to temporarily maintain the inner sleeve in an expanded state and the outer sleeve in an expanded state. The duct is flexible. The duct is operative to resist radial collapse of the duct and to bend radially inwardly as the holdout is axially removed from the inner sleeve.

According to some method embodiments, a method for forming a connection assembly includes forming an electrical connection between first and second electrical cables, the first and second cables each including a primary conductor and at least one neutral conductor. The method further includes providing an integral, unitary pre-expanded cover assembly unit including a cover assembly and a removable holdout. The cover assembly includes: an elastomeric inner sleeve defining a cable passage to receive the electrical connection and the primary conductors of the first and second cables; an elastomeric outer sleeve surrounding the inner sleeve; and a duct interposed radially between the inner and outer sleeves, the duct defining a duct passage configured to receive at least one of the neutral conductors therethrough. The removable holdout is mounted within the inner sleeve. The holdout is operative to temporarily maintain the inner sleeve in an expanded state and the outer sleeve in an expanded state. The duct is flexible. The duct is operative to resist radial collapse of the duct and to bend radially inwardly as the holdout is axially removed from the inner sleeve. The method further includes: mounting the cover assembly on the cables such that the electrical connection and the primary conductors of the first and second cables extend through the cable passage; inserting the at least one neutral conductor of the first cable through the duct passage; axially removing the holdout from inner sleeve such that duct bends radially inwardly as the holdout is removed; and coupling the at least one neutral conductor of the first cable with the at least one neutral conductor of the second cable.

According to some embodiments, an integral, unitary cover assembly for covering an electrical connection between first and second electrical cables each having a primary conductor and a neutral conductor includes an elastomeric inner sleeve, an elastomeric outer sleeve, and a duct system. The elastomeric inner sleeve has a sleeve axis and defines a cable passage to receive the electrical connection and the primary conductors of the first and second cables. The elastomeric outer sleeve surrounds the inner sleeve. The duct system includes a plurality of ducts disposed in series and interposed radially between the inner and outer sleeves. Each of the plurality of ducts defines a duct passage configured to receive at least one of the neutral conductors therethrough.

According to some method embodiments, a method for forming a connection assembly includes forming an electrical connection between first and second electrical cables, the first and second cables each including a primary conductor and at least one neutral conductor. The method further includes providing an integral, unitary cover assembly including: an elastomeric inner sleeve having a sleeve axis and defining a cable passage to receive the electrical connection and the primary conductors of the first and second cables; an elastomeric outer sleeve surrounding the inner sleeve; and a duct system including a plurality of ducts disposed in series and interposed radially between the inner and outer sleeves. Each of the plurality of ducts defines a duct passage configured to receive at least one of the neutral conductors therethrough. The method further includes: mounting the cover assembly on the cables such that the electrical connection and the primary conductors of the first and second cables extend through the cable passage; inserting the at least one neutral conductor of the first cable through the duct passages of the ducts; and coupling the at least one neutral conductor of the first cable with the at least one neutral conductor of the second cable.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 12-16 are side views illustrating procedures for installing the cover assembly of FIG. 1 on a pair of concentric neutral cables coupled by a connector.

FIG. 17 is a cross-sectional view of the covered splice connection of FIG. 16.

DETAILED DESCRIPTION OF EMBODIMENTS OF THE INVENTION

Figure 1:
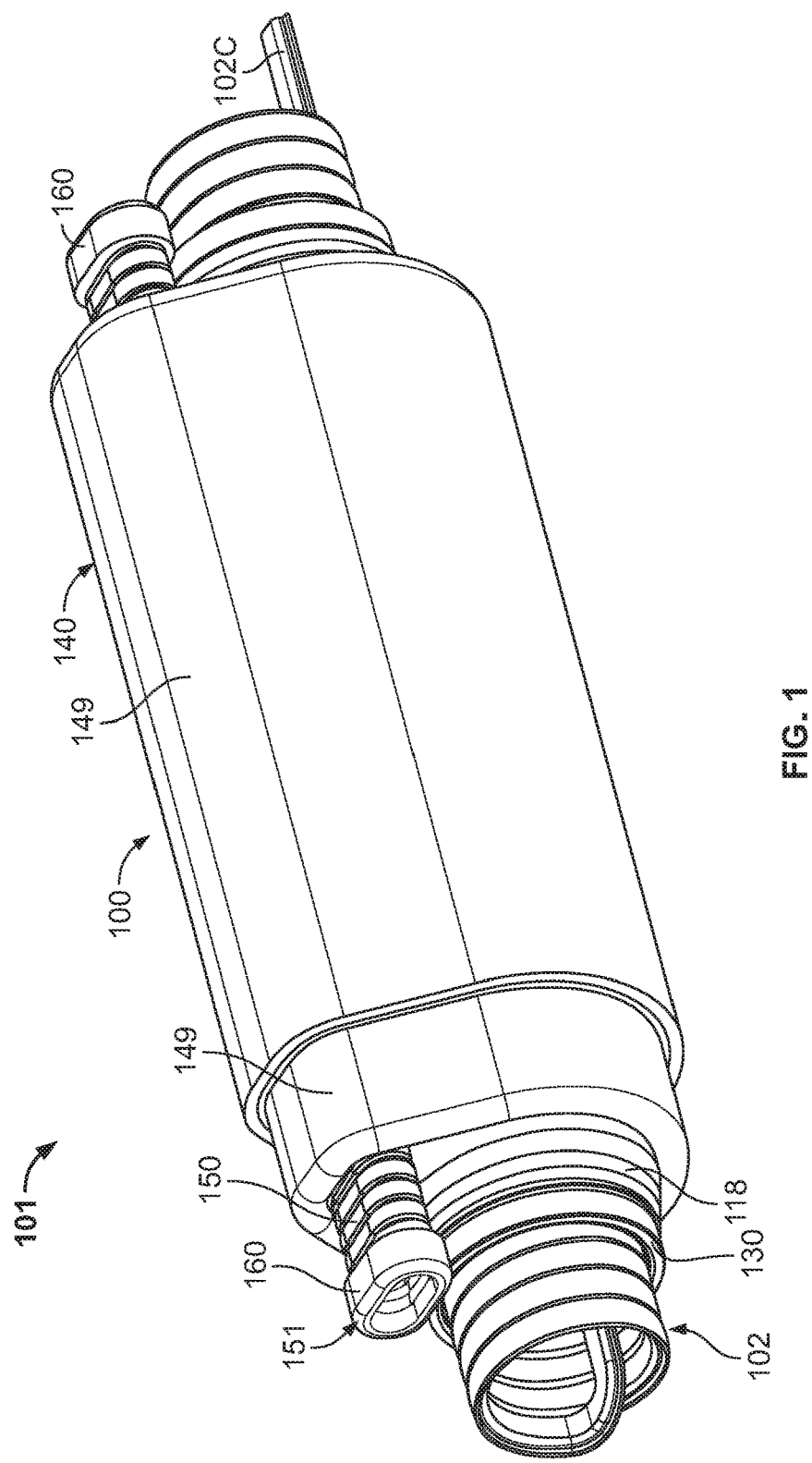
FIG. 1 is a perspective view of a pre-expanded cover assembly unit including a cover assembly and a holdout device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to FIGS. 1-19, a cover assembly 100 according to some embodiments of the present invention is shown therein.

The cover assembly 100 may be used to cover and electrically insulate electrical substrates such as cables and connectors. The cover assembly 100 may be provided as a pre-expanded cover assembly unit 101 including a holdout device 102, as shown in FIGS. 1-4, wherein the cover assembly 100 is in an expanded state or position. The cover assembly 100 may be deployed and mounted on the intended substrate in a retracted state or position as shown in FIGS. 16 and 17 and discussed in more detail below. According to some embodiments, the cover assembly 100 is a cold shrink cover, meaning that it can be shrunk or retracted about the substrate without requiring the use of applied heat.

The cover assembly 100 includes an release layer 112, a metal contact layer 114, two duct retention bands or tapes 116, two metal contact layer retention bands or tapes 118, a Faraday cage layer 122, two stress cone layers 124, an inner sleeve (or insulation body) 130, a semiconductor layer 139, an outer sleeve (or re-jacket) 140, and a passthrough tube or duct 151, as discussed in more detail below. In some embodiments, the Faraday cage layer 122, the stress cone layers 124, and the inner sleeve 130 are bonded (e.g., adhered or molded) together to form a unitary component in the form of a sleeve assembly 131.

The cover assembly 100 may be used to cover and seal a connection or splice between two or more cables 40, 50 including a connector 60 to form a connection assembly 10 as shown in FIGS. 16 and 17. According to some embodiments, the cables 40, 50 are concentric neutral cables.

Referring to FIGS. 1-4, the cover assembly 100 has a lengthwise axis A-A. The Faraday cage layer 122, the stress cone layers 124, the inner sleeve 130, the semiconductor layer 139, the outer sleeve 140, and the duct 151 are provided as an integral, unitary structure extending lengthwise along the axis A-A. According to some embodiments, the cover assembly 100 is provided pre-installed and pre-expanded on the holdout 102.

The inner sleeve 130 has opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 120 of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the layers 122, 124 are formed of a material having a Modulus at 100 percent elongation (M100) in the range of from about 0.68 to 0.88 MPa.

The semiconductor layer 139 fully circumferentially surrounds the inner sleeve 130. According to some embodiments, the semiconductor layer 139 is coextensive with the inner sleeve 130.

The metal contact layer 114 is an electrically conductive, tubular sleeve surrounding and contacting the semiconductor layer 139. In some embodiments, the metal contact layer 114 is a copper mesh wrap or sock. The metal contact layer 114 is secured to the inner sleeve 130 by the tape wraps 118. The tapes 118 may be vinyl, adhesive-backed tape, for example.

Figure 2:
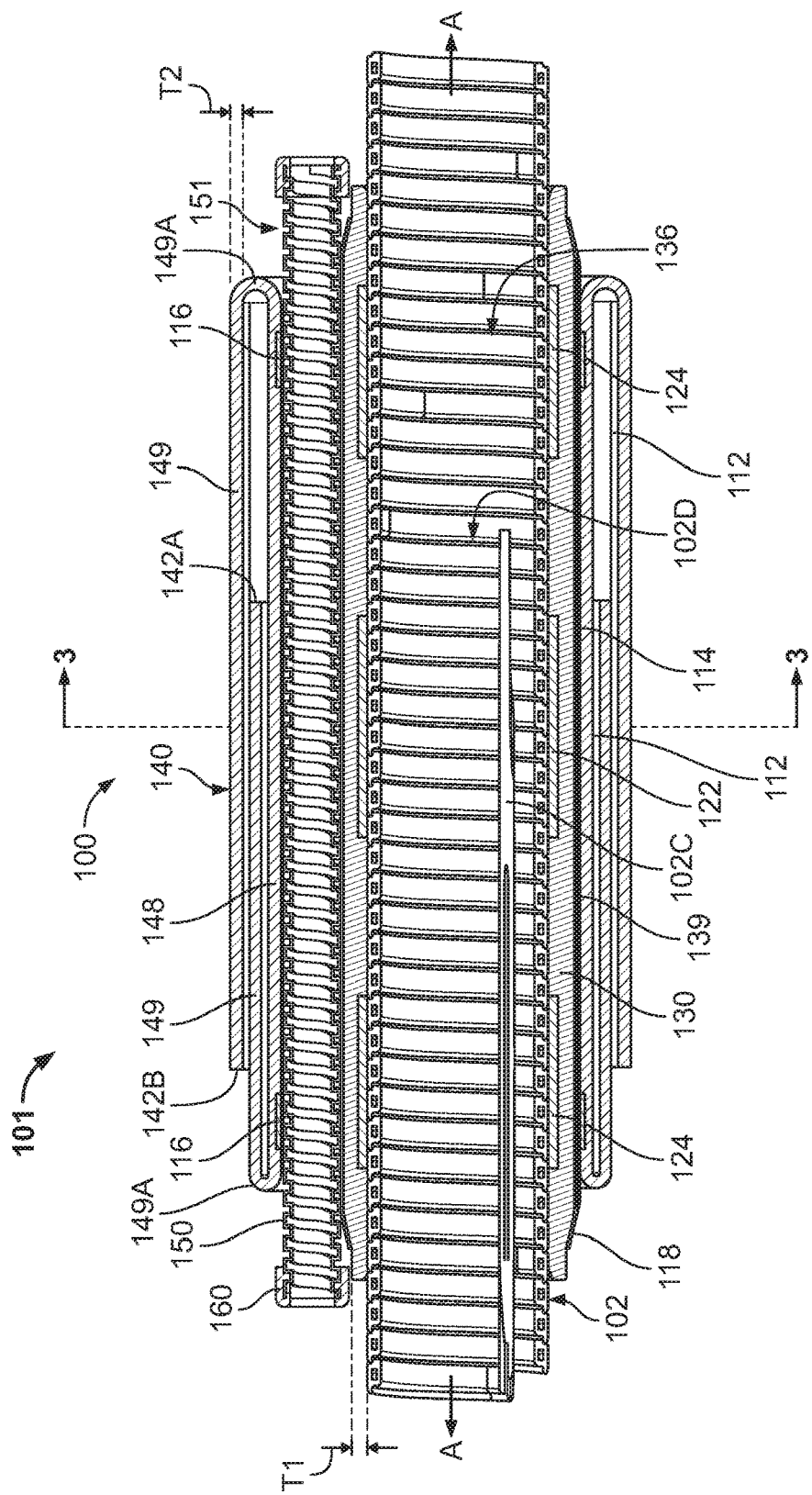
FIG. 2 is a cross-sectional view of the pre-expanded cover assembly unit of FIG. 1 taken along the line 2-2 of FIG. 1.
Figure 3:
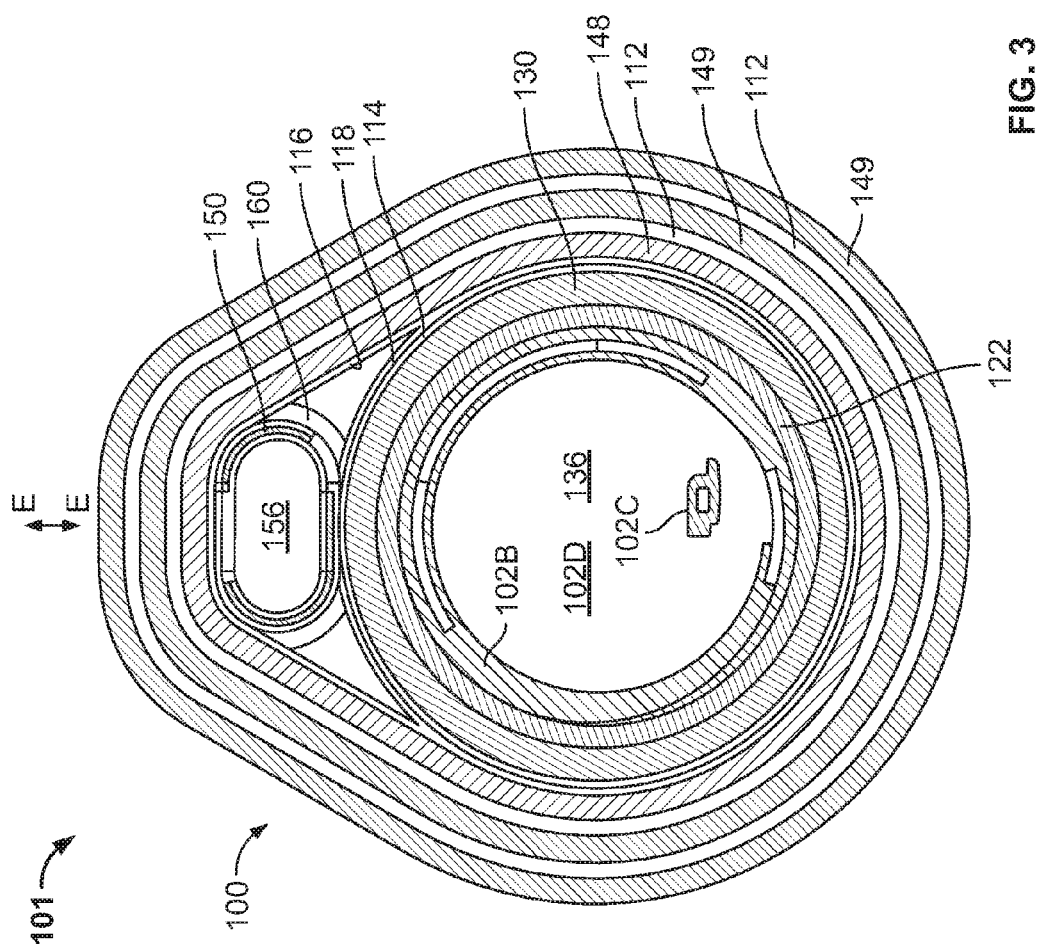
FIG. 3 is a cross-sectional view of the pre-expanded cover assembly unit of FIG. 1 taken along the line 3-3 of FIG. 2.
Figure 4:
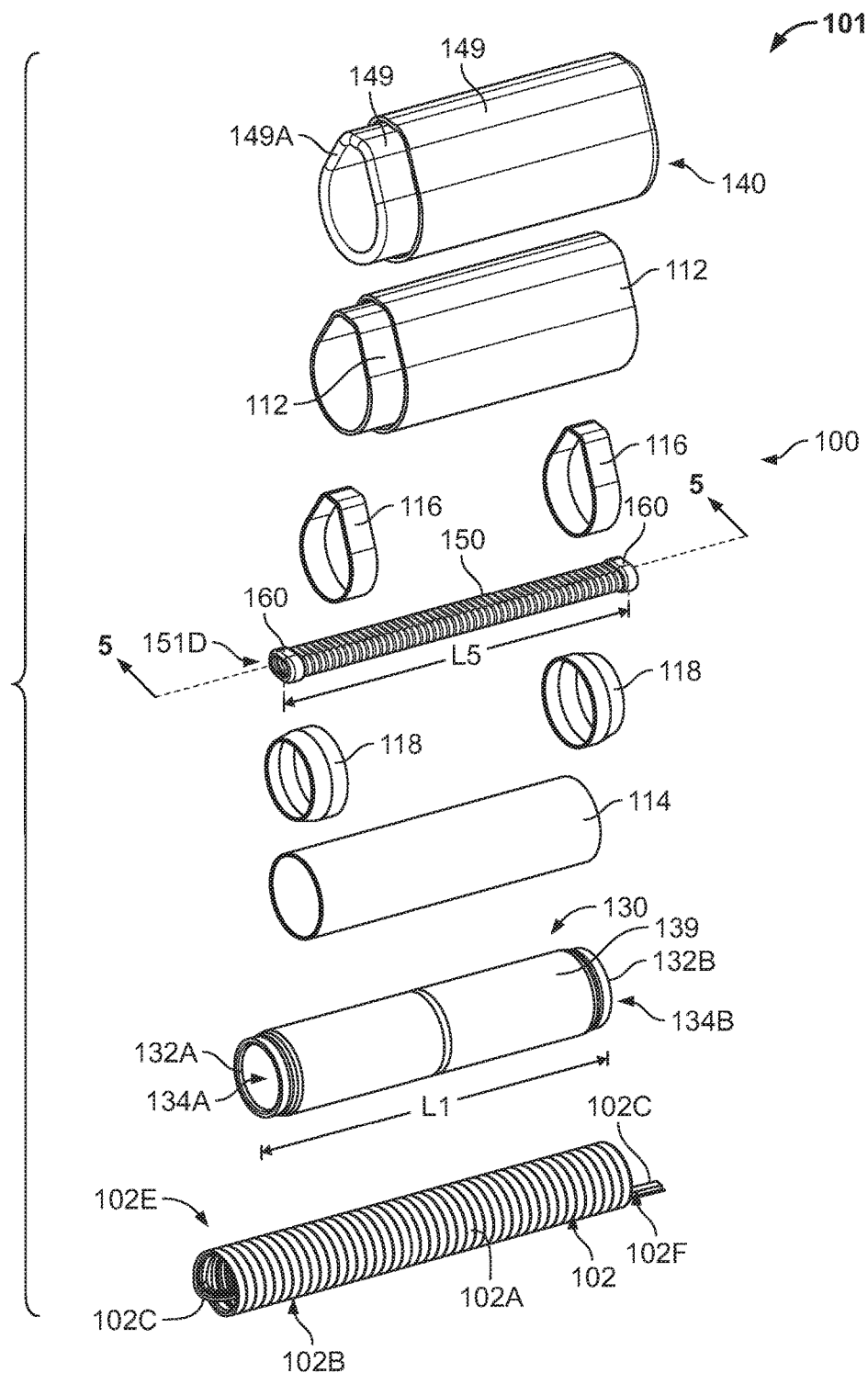
FIG. 4 is an exploded, perspective view of the pre-expanded cover assembly unit of FIG. 1.
Figure 5:
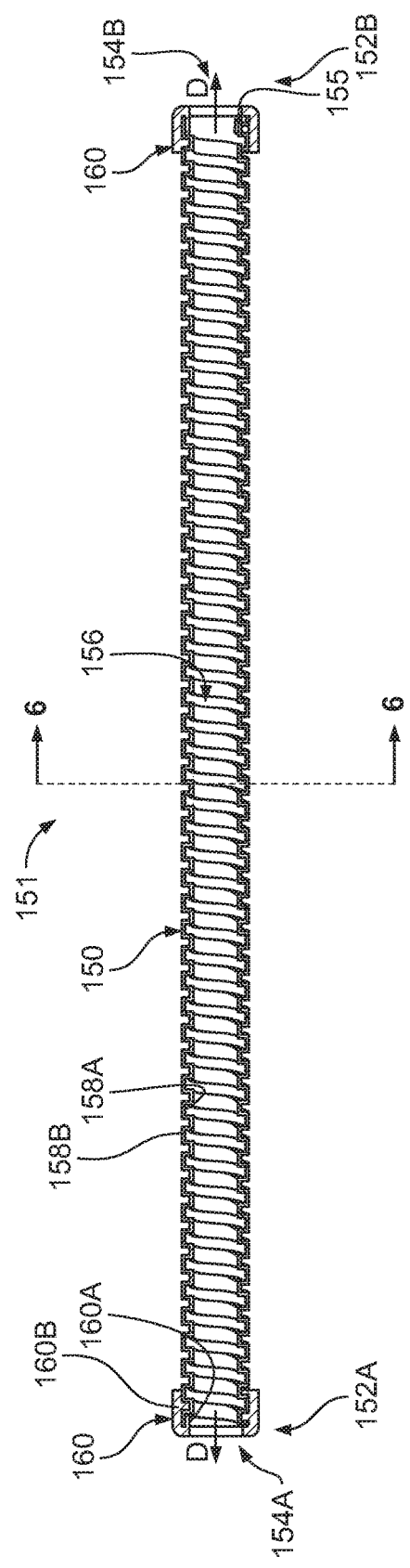
FIG. 5 is a cross-sectional view of a duct forming a part of the pre-expanded cover assembly unit of FIG. 1 taken along the line 2-2 of FIG. 1.

The outer sleeve 140 has opposed ends 142A, 142B (FIG. 2). The outer sleeve 140 is tubular and defines an axially extending conductor through passage that communicates with opposed end openings 144A, 144B (FIG. 17). When mounted on the holdout 102 as shown in FIGS. 1-3, outer sections 149 of the outer sleeve 140 are folded back on an intermediate section 148 of the outer sleeve 140 at annular folds 149A.

The release layers 112 are tubular sleeves surrounding the outer sleeve 140 between each folded back outer section 149 and the opposing underlying portion of the outer sleeve 140. The release layers 112 reduce friction and binding between the overlying portions of the outer sleeve 140 so that the outer sections 149 can be more easily slid or rolled into their extended positions as discussed below. The release layers 112 may be formed of a polymeric material (e.g., vinyl) mesh. The release layers 112 may also be provided with a lubricant (e.g., grease).

The duct 151 is a tubular assembly including a tubular duct sleeve or body 150 and a pair of end caps or covers 160. The duct 151 has opposed ends 151A, 151B and a lengthwise axis D-D extending substantially parallel to the cover assembly axis A-A. The duct 151 is secured to the inner sleeve 130 over the copper mesh 114 by the tape wraps 116. The tapes 116 may be vinyl, adhesive-backed tape, for example.

The duct body 150 is flexible, tubular and elongate. The duct body 150 has opposed ends 152A, 152B and a lengthwise axis extending substantially parallel to, and in some embodiments substantially concentric with, the lengthwise axis D-D of the duct assembly 151. The duct body 150 has an inner surface 158A and an outer surface 158B. The inner surface 158A defines an axially extending neutral conductor through passage 156 terminating at and communicating with opposed and openings 154A. 154B (defined by terminal end edges 155).

An end cover 160 is secured to each end 152A, 152B. Each end cover 160 has a portion covering the corresponding end edge 155. Each end cover 160 may also include inner tubular portion 160A covering the inner surface 158A and an outer tubular portion 160B covering the outer surface 158B adjacent the end opening 154A, 154B.

Figure 6:
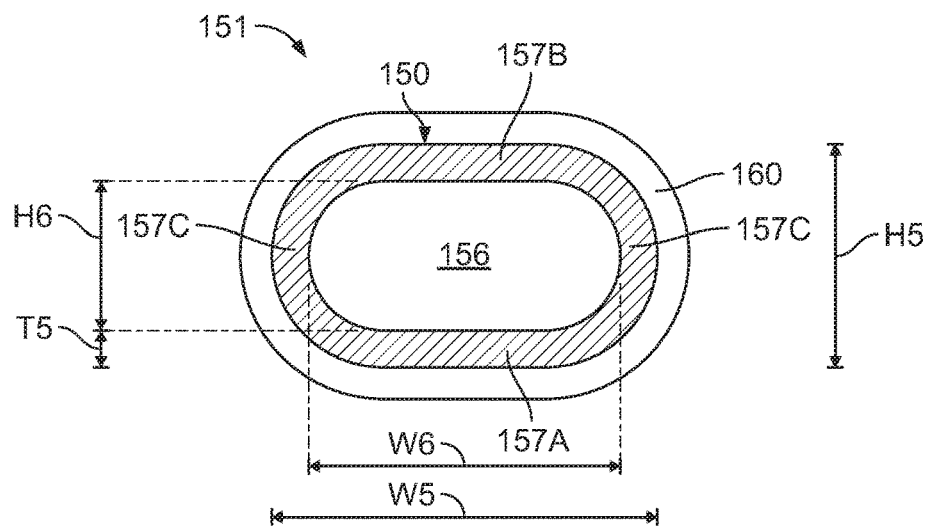
FIG. 6 is a cross-sectional view of the duct of FIG. 5 taken along the line 6-6 of FIG. 5.

With reference to FIG. 6, the duct body 150 has substantially discorectangle or stadium geometric shape in cross-section along a plane orthogonal to the lengthwise axis D-D. A stadium shape generally consists of a rectangle with semi-circles at a pair of opposed sides. More particularly, the duct body 150 has an inner wall 157A, an outer wall 157B, and opposed side walls 157C. The inner and outer walls 157A, 157B are substantially flat or planar and are substantially parallel to one another. The side walls 157C are substantially semi-circular or C-shaped in cross-section. In some embodiments, each side wall 157C has an arc angle in the range of from about 175 to 185 degrees. The stadium shape can provide ease of bending about a primary bend axis BA-BA that is transverse to the lengthwise axis D-D, while also providing good crush resistance along a primary outer sleeve load axis C-C.

The semiconductor layer 139 can be formed of any suitable electrically semiconductive material. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material. According to some embodiments, the inner sleeve 130 is formed of a dielectric or electrically insulative material. According to some embodiments, the inner sleeve 130 is formed of an elastically expandable material. According to some embodiments, the inner sleeve 130 is formed of an elastomeric material. According to some embodiments, the inner sleeve 130 is formed of liquid silicone rubber (LSR). Other suitable materials may include EPDM or ethylene propylene rubber (EPR). According to some embodiments, the inner sleeve 130 has a Modulus at 100 percent elongation (M100) in the range of from about 0.4 to 0.52 MPa.

According to some embodiments, the thickness T1 (FIG. 2) of the inner sleeve 130 is in the range from about 0.07 to 2 inches. According to some embodiments, the length L1 (FIG. 4) of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness T2 (FIG. 2) of the outer sleeve 140 is in the range of from about 0.03 to 0.25 inch. According to some embodiments, the length L2 (FIG. 16) of the outer sleeve 140 is in the range of from about 15 to 35 inches. According to some embodiments, the length of each outer section 149 of the outer sleeve 140 is in the range of from about 10 to 90 percent of the length L2.

According to some embodiments, the duct body 150 has a width W5 (FIG. 6) in the range of from about 0.5 to 2.0 inches. According to some embodiments, the duct body 150 has a height of H5 (FIG. 6) in the range of from about 0.25 to 1.0 inches.

According to some embodiments, the length L5 (FIG. 4) of the duct 151 is in the range of from about zero to 3 inches greater or shorter than the length L1 of the inner sleeve 130.

In some embodiments, the passage 156 has a height H6 (FIG. 6) in the range of from about 0.125 to 1.0 inch. In some embodiments, the passage 156 has a width W6 (FIG. 6) in the range of from about 0.25 to 2 inches.

While the duct 151 as illustrated extends beyond the full length of the inner sleeve 130, according to other embodiments, the duct extends only partially (i.e., a distance less than the full length) across the inner sleeve 130.

The duct body 150 can be formed of any suitable material. According to some embodiments, the duct body 150 is formed of a flexible material that is geometrically configured to permit or enable flexibility of the duct body 150 as described herein. In some embodiments, the duct body 150 is formed of a semi-rigid material that is geometrically configured to permit or enable flexibility of the duct body 150 as described herein. In some embodiments, the duct body 150 is formed of a semi-rigid or rigid material and includes integral joints, joint features or joint mechanisms that permit or enable flexibility of the duct body 150 as described herein. In some embodiments, the joints enable the duct body 150 to bend at prescribed locations along the length of the duct body 150.

According to some embodiments, the duct body 150 is formed of metal. According to some embodiments, the duct body 150 is formed of aluminum. According to some embodiments, the duct body 150 is formed of steel, and may be formed of galvanized steel.

According to some embodiments, the duct body 150 is formed of a polymeric material.

According to some embodiments, the duct body 150 is formed of an electrically conductive plastic.

According to some embodiments, the duct body 150 is formed of an electrically conductive material. According to some embodiments, the duct body 150 is formed of an electrically conductive material (e.g., an electrically conductive plastic) having a volume resistivity no higher than 100 Ω-cm.

In some embodiments, the electrically conductive plastic is a plastic filled with electrically conductive particles such as carbon. Other suitable materials may include a metal such as copper or aluminum.

According to some embodiments, the duct body 150 is formed of a combination of materials such as metal and plastic adhered to each other.

The end covers 160 can be formed of any suitable material. According to some embodiments, the end covers 160 are formed of a polymeric material. According to some embodiments, the end covers 160 are formed of PVC or vinyl. According to some embodiments, the end covers 160 are formed of an elastomeric material. According to some embodiments, the end covers 160 are formed of rubber. In some embodiments, each end cover 160 has a thickness in the range of from about 0.01 to 0.25 inch.

The end covers 160 may be secured to the ends 152A. 152B in any suitable manner. In some embodiments, the end covers 160 are bonded to the duct body 150. In some embodiments, the end covers 160 are adhered to the duct body 150 by adhesive. In some embodiments, the end covers 160 are molded onto the duct body 150 (in some embodiments, by injection molding or insert molding). In some embodiments, the end covers 160 coated onto the duct body 150 such as by dipping, spraying or painting.

According to some embodiments, the duct body 150 is formed of a material having an Elastic Modulus in the range of from about 2 GPa to 3.5 GPa and, in some embodiments, in the range of from about 0.5 GPa to 2 GPa.

According to some embodiments, the nominal thicknesses T5 (FIG. 6) of the walls 157A-C of the duct body 150 are in the range of from about 0.02 to 0.063 inch.

According to some embodiments, the holdout 102 includes a flexible strip 102A helically wound to form a holdout body in the form of a rigid cylinder 102B defining a holdout passage 102D. The strip 102A includes a pull cord 102C extending from a distal end 102E of the cylinder 102B and through the passage 102D and beyond the proximal end 102F of the cylinder 102B.

The holdout device 102 may be factory installed. The holdout 102 can be formed of any suitable material. According to some embodiments, the holdout 102 is formed of a semi-rigid or rigid plastic. In some embodiments, the holdout 102 is formed of polypropylene, PVC or ABS.

The cover assembly 100 may be formed by any suitable method and apparatus. According to some embodiments, the inner sleeve 130 is molded and the outer sleeve 140 is thereafter insert overmolded about the inner sleeve 130 with the duct 151 and other components interposed therebetween.

According to further embodiments, the inner sleeve 130 and the outer sleeve 140 are separately formed (for example, by molding or extrusion) and thereafter the outer sleeve 140 is mounted on the inner sleeve 130 with the duct 151 and other components interposed therebetween.

According to some embodiments, the inner sleeve 130 is unitarily molded. According to some embodiments, the outer sleeve 140 is unitarily molded. Alternatively, the inner sleeve 130 and/or the outer sleeve 140 may be extruded. According to some embodiments, the inner sleeve 130 and/or the outer sleeve 140 is unitarily extruded.

Figure 11:
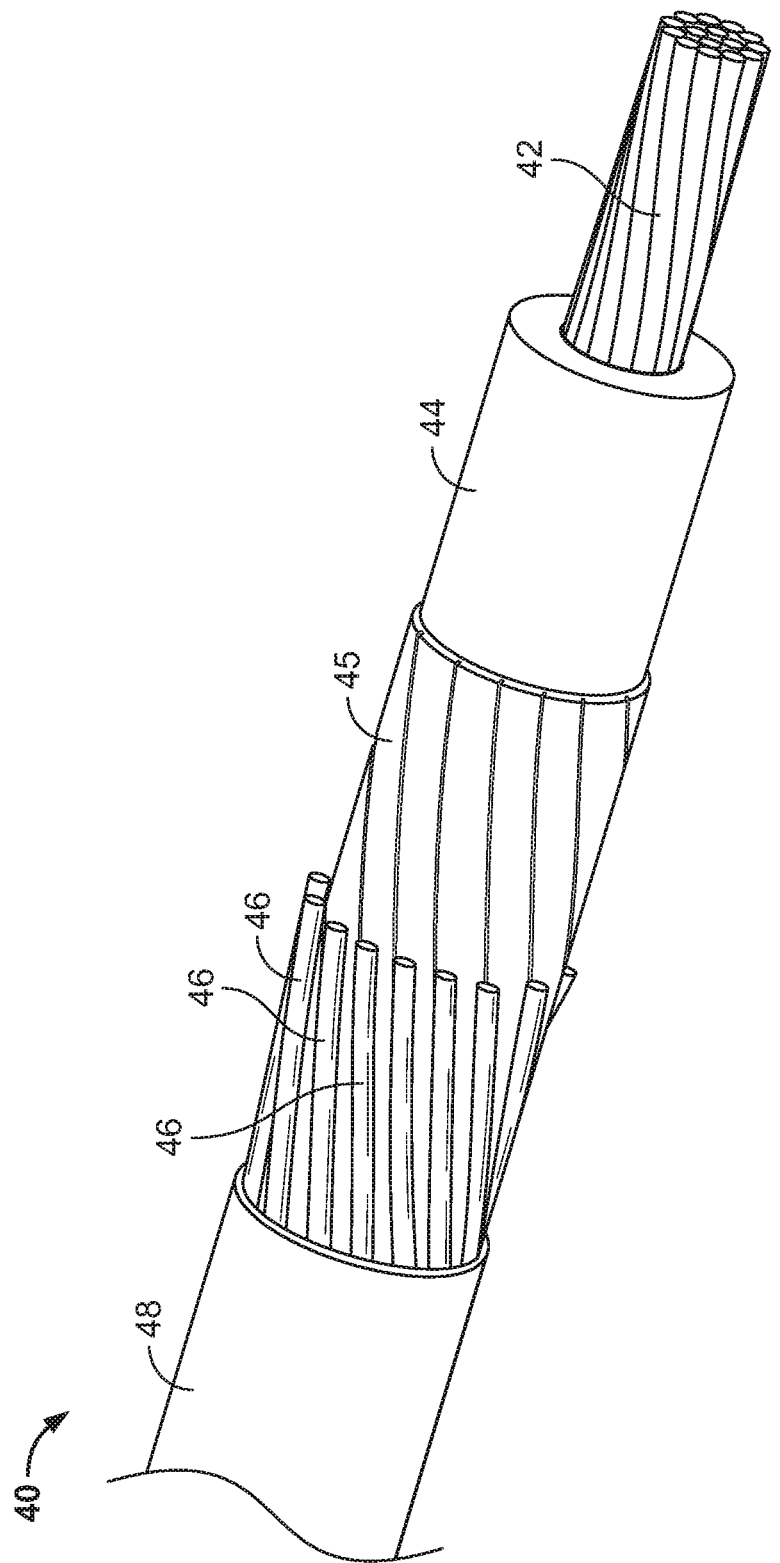
FIG. 11 is a perspective view of an exemplary concentric neutral cable.

Referring now to FIGS. 11-17, the pre-expanded unit 101 may be used in the following manner to apply the cover 100 over a splice connection 15 (FIG. 12) between a pair of electrical power transmission cables 40, 50 to form a connection assembly 10. According to some embodiments, the cables 40, 50 are low-voltage or medium-voltage (e.g., between about 5 and 46 kV) power transmission cables. As shown in FIG. 11, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

Figure 12:
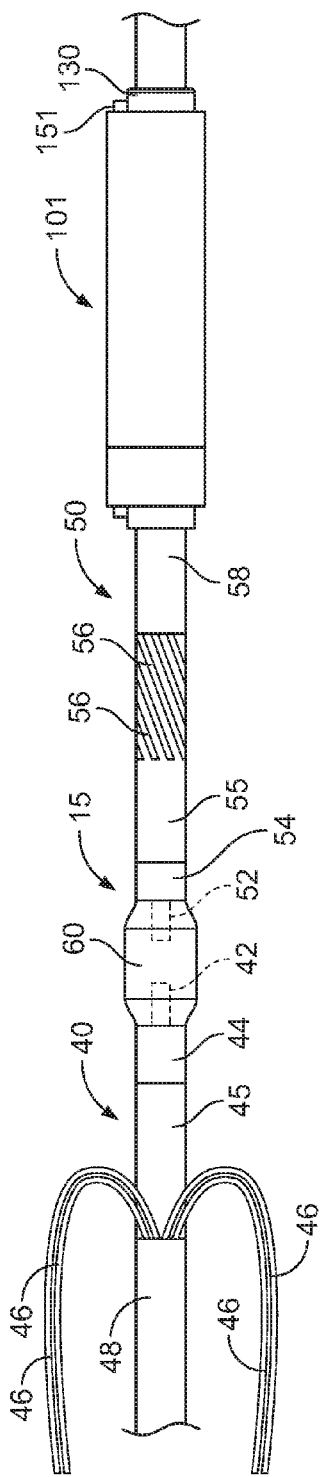

The connection assembly 10 may be formed and the cover assembly 100 may be installed as follows. The cables 40, 50 are prepared as shown in FIG. 12 such that a segment of each layer extends beyond the next overlying layer, except that the neutral conductors 46 of the cable 40 extend at least a prescribed distance beyond the end of the primary conductor 42. This excess length of the conductors 46 can be folded back away from the terminal end of the primary conductor 42 as shown in FIG. 12.

The pre-expanded unit 101 is slid over the cable 50 as shown in FIG. 12. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 136. The pre-expanded unit 101 may be retained or parked on the cable 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 12. The connector 60 may be any suitable type of connector such as a metal crimp connector.

Figure 13:
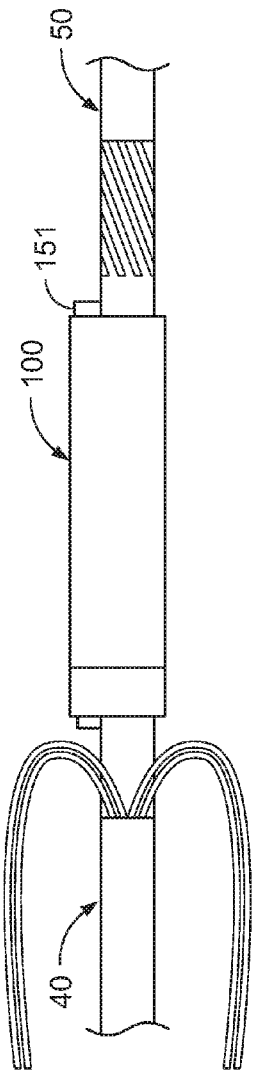

The pre-expanded unit 101 is then slid into position over the connector 60 as shown in FIG. 13. The holdout 102 is then removed from the cover assembly 100, thereby permitting the elastomeric sleeves 130, 140 to relax and radially retract about the cables 40, 50 and the connector 60 as shown in FIG. 15. According to some embodiments, the inner sleeve 130 overlaps and engages the semiconductor layers 44, 54 of the cables 40, 50.

Figure 14:
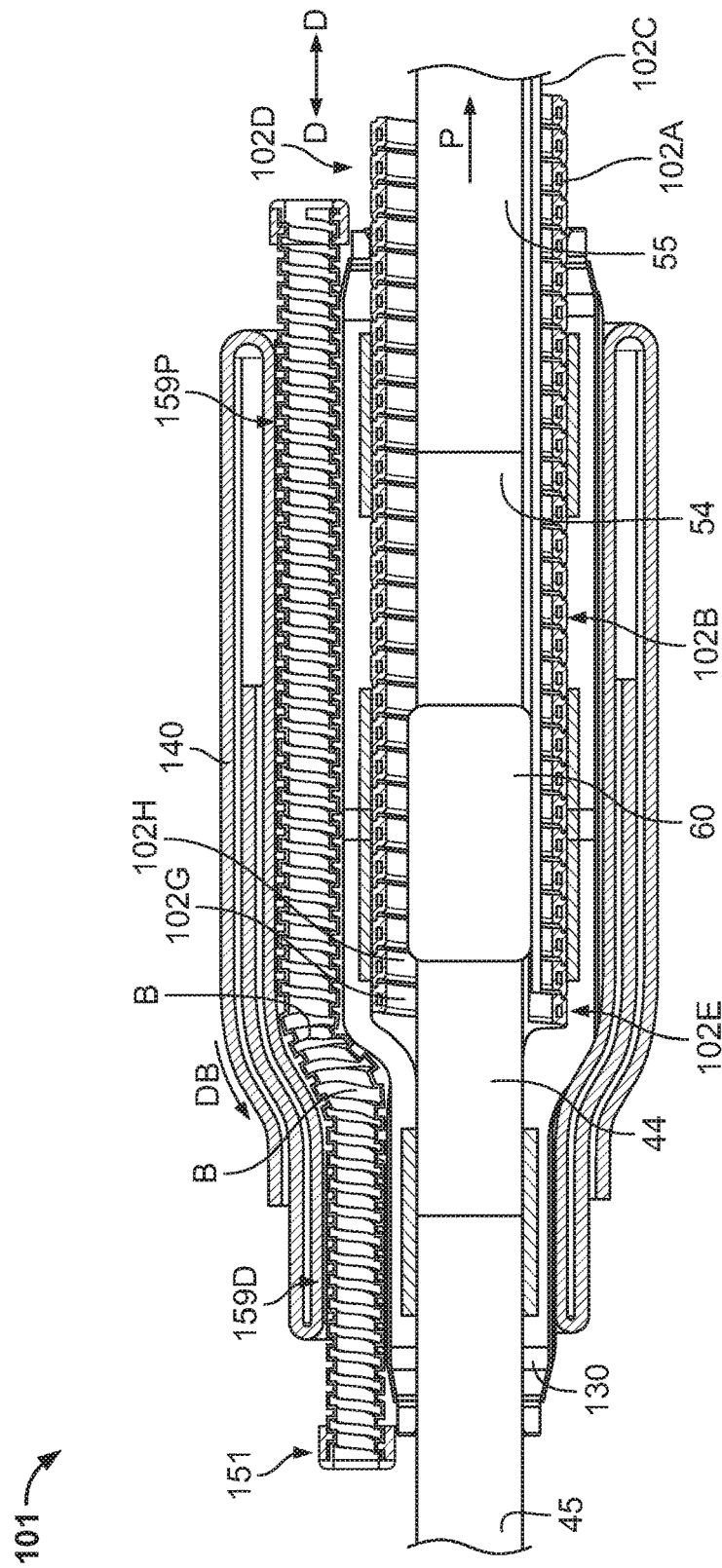

More particularly and with reference to FIG. 14, the holdout 102 is removed by pulling the pull cord 102C through the passage 102D in a withdrawal direction P (i.e., from the distal end 102E to the proximal end 102F). As a result, the strip 102A is progressively removed from the distal end 102E, causing the cylinder 102B to progressively disintegrate from the distal end 102E as illustrated in FIG. 14. This in turn permits the inner sleeve 130 and the outer sleeve 140 to contract radially inwardly. This process is continued until the cylinder 102B is fully disintegrated and the strip 102A removed from the inner sleeve 130 as illustrated in FIG. 17.

As the cylinder 102B disintegrates, the more distal portion of the inner sleeve 130 and the more distal portion 159D of the duct 151 are no longer supported by the cylinder 102B while the remaining, more proximal portion of the inner sleeve 130 and the more proximal portion 159P of the duct 151 are still supported by the cylinder 102B. The radially compressive load of the elastically expanded outer sleeve 140 is exerted on both duct portions 159D, 159P.

If the duct 151 were rigid and did not bend at or proximate the distal end 102E, the force applied to the unsupported portion 159D would be transferred by the duct 151 to the portion of the elastomeric inner sleeve 130 bearing on the endmost coil 102G of the holdout strip 102A. Moreover, this force would be applied to the endmost coil 102G in a substantially axial direction. This force would tend to load or bind the inner sleeve 130 against the endmost coil 102G, creating substantial friction between the inner sleeve 130 and the endmost coil 102G that resists displacement of the endmost coil 102G. This force may also tend to axially load the endmost coil 102G against the next coil 102H, making it harder to separate the coils 102G, 102H. The pull force required on the pull cord 102C to remove the holdout 102 would be thereby increased.

However, in the case of the pre-expanded unit 101 having a flexible duct 151, the duct 151 deflects or bends at one or more bend locations or bends B at or proximate the juncture between the unsupported portion 159D and the supported portion 159P. The unsupported portion 159D deflects or bends radially inwardly with respect to the supported portion 159P in a bend direction DB. The radially compressive load of the outer sleeve 140 is thus exerted radially onto the underlying substrate rather than being redirected axially by the duct 151. In this way, the required pull force can be substantially reduced. This makes removal of the holdout easier, for easier installation of the cover assembly 100.

It will be appreciated that the location of the distal end 102E the cylinder 102B and the identity of the endmost coil 102G varies as the strip 102A is pulled away from the distal end 102E, and the location of the bend B in the duct 151 likewise varies. Also, the duct 151 may assume multiple bends B to conform to the uneven outer contour of the inner sleeve 130 (which itself conforms to the uneven outer contour of the underlying elongate substrate 40, 50, 60).

As mentioned above, the unsupported portion 159D of the duct 151 bends radially inwardly in a bend direction DB. The duct 151 bends about a bend axis BA-BA. The bend direction DB is transverse to (but does not necessarily intersect) the longitudinal axis D-D. The bend direction DB may be generally toward the longitudinal axis D-D, but may not intersect the longitudinal axis D-D. The duct 151 may also be bent laterally or sidewardly (about a lateral axis E-E FIG. 3). Thus, the direction of each bend B may be substantially entirely radial, substantially entirely lateral, or have both a radial component and a lateral or sideward component.

The excess length of the neutral conductors 46 is routed or threaded through the passage 156 of the duct 151. The material rigidity and geometric configuration of the duct body 150 resists or prevents the duct body 150 from radially collapsing under the radially compressive load of the outer sleeve 140. In this manner, the passage 156 is maintained open for feeding the neutral conductors 46 therethrough.

The neutral conductors 46 are then electrically and mechanically coupled to the neutral conductors 56 by any suitable neutral connector 62 as shown in FIG. 15. The neutral connector 62 may be any suitable connector such as a metal crimp connector. As shown in FIG. 15, the neutral conductors 46, 56 of the two cables 40, 50 may be coupled to one another on only one side of the connector 60. Alternatively, the neutral conductors 46, 56 may be coupled to one another on both sides of the connector 60.

Notwithstanding the capability to bend as described above, the duct 151 resists the radial compression of the outer sleeve 140 prior to removal of the holdout 102 to prevent radial collapse of the passage 156 and maintain the lateral cross-sectional profile of the duct 151 (FIG. 6). In this way, the size and shape of the passage 156 is substantially maintained in order to permit insertion of the neutral conductors 46 therethrough. According to some embodiments, the duct 151 has sufficient radial load resistance to substantially maintain the lateral cross-sectional profile of the duct 151 also after the holdout 102 has been removed and the duct 151 has bent. In some embodiments, the duct 151 has sufficient radial load resistance (i.e., inward transversal pressure resistance) to substantially maintain the lateral cross-sectional profile of the duct 151 in the bends B after the holdout 102 has been removed.

The inner wall 157A of the duct body 150 makes electrical contact with the copper mesh 114, which in turn makes electrical contact with the semiconductor layer 139. The neutral conductors 46 make electrical contact with the duct body 150 as well. In this way, electrical continuity is provided between the neutral conductors 46, 56 and the semiconductor layer 139 through the duct body 150 so that the semiconductor layer 139 is electrically grounded by the neutral conductors 46, 56.

The duct 151 protects the outer sleeve 140 from protruding neutral conductors 46. The end covers 160 protect the outer sleeve 140 from the edges 155 of the duct body 150.

Strips of sealant 64 may be applied to the outer surfaces of the cable jackets 48, 58. The operator then rolls each of the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 64 to provide a moisture seal. The cover assembly 100 is thereby fully installed to form the connection assembly 10 as shown in FIGS. 16 and 17.

Alternatively, the neutral conductors 46 can be routed through the duct 151 before the holdout 102 has been removed and the cover assembly 100 has been initially secured about the splice connection 15. In this case, the duct 151 may be in its initial linear configuration when the neutral conductors are inserted through the passage 156.

According to further embodiments, the cover assembly 100 may include more than one duct 151 and the ducts may be disposed at different positions about the circumference of the cover assembly 100. In this case, the neutral conductors 46 can routed through two or more of the duct assemblies.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50. The outer sleeve 140 thereby effects a liquid tight seal at the interface between the cable jackets 48, 58 and the outer sleeve 140. This seal can protect the cable and the splice from the ingress of environmental moisture. According to some embodiments the relaxed inner diameter of the inner sleeve 130 is at least 10% less than the smallest diameter cable upon which the cover assembly 100 is intended to be installed.

Cover assemblies and methods of the present invention and as described herein can provide a number of advantages. The cover assembly 100 provides an "all-in-one" integral unit that can be installed in similar fashion to known cold shrink splice cover insulating tubes and that also accommodates the neutral conductors of concentric neutral cables. The cover assembly 100 including the inner sleeve 130, the outer sleeve 140 and the duct 151 can be preassembled at a factory. Therefore, it is not necessary to provide and install a separate and supplemental re-jacketing cover to cover the neutral conductors (which must be electrically insulated from the primary conductors 42, 52 and the primary connector 60).

The cover assembly 100 can also provide advantages over known "all-in-one" integral units of the type wherein an electrically conductive mesh is incorporated into the cover assembly to engage and provide continuity between the neutral conductors (typically, copper tapes) of the concentric neutral cables. In particular, in the case of these known cover assemblies, the electrically conductive mesh may not be sufficiently conductive to provide the amount of continuity desired or required. For example, the neutral conductors of the cables being spliced may have a greater combined gauge than that of the connecting mesh. By permitting the use of the original neutral conductors of the cables 40, 50, the cover assembly 100 can ensure that the neutral conductors provided across the cover assembly 100 and the splice connection 15 are of the proper gauge. In this way, adequate continuity between the cables 40, 50 can be ensured.

The cover assemblies and methods of the present invention also permit the operator to form the connection with only a single connection (for example, crimp connection) between the neutral conductors of one cable and the neutral conductors of the other cable. Moreover, this configuration permits the operator to form the connection with a crimp on only one side of the splice.

More generally, the cover assemblies and methods of the present invention can provide improvements in ease of installation.

As discussed herein, the duct body 150 is constructed so as to be easily bendable about axes transverse to the lengthwise axis D-D of the duct 151 and the axis A-A of the unit 101 while resisting being radially crushed by the outer sleeve 140. In some embodiments, this combination of mechanical performance is achieved by the mechanical and geometric configuration of the duct body 150.

In some embodiments, the duct body 150 is a tubular, flexible corrugated conduit.

Figure 7:
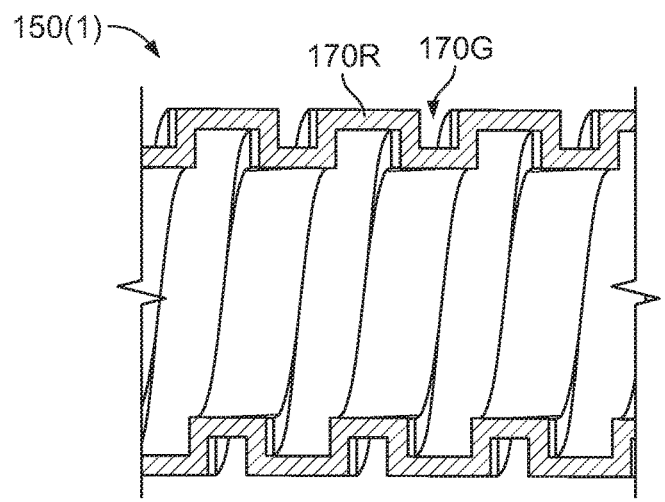
FIG. 7 is an enlarged, fragmentary, cross-sectional view of the duct of FIG. 5 taken along the line 2-2 of FIG. 1.

In some embodiments and with reference with to FIG. 7, the duct body 150 is a corrugated conduit 150(1) having an axially extending, helically wound corrugation ridge 170R and an axially extending, helically wound corrugation groove 170G (i.e., a helically corrugated tube). The duct body 150(1) can bend about the bend axis BA-BA and transversely to the lengthwise axis D-D of the corrugated conduit 150(1) by bending or flexing at the corrugations.

Figure 8:
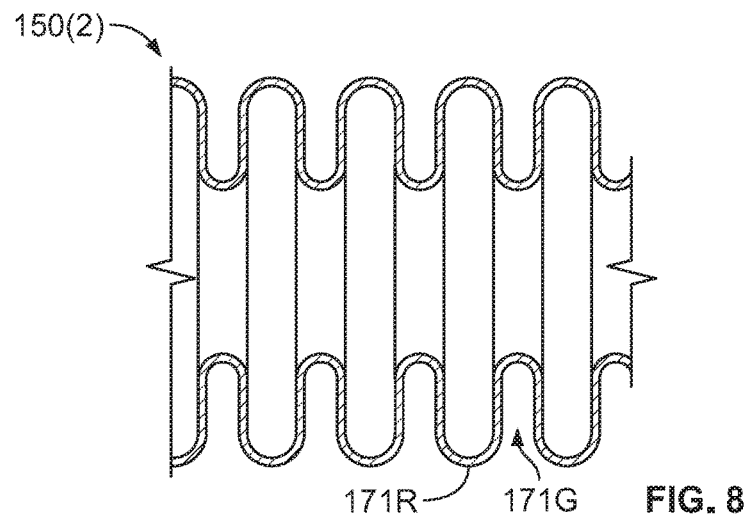
FIG. 8 is a fragmentary, cross-sectional view of an alternative duct body that may be used in pre-expanded cover assembly units according to further embodiments of the present invention.

In some embodiments and with reference with to FIG. 8, the duct body 150 is a tubular, flexible corrugated conduit 150(2) having an axially distributed series of annular corrugation ridges 171R and grooves 171G (i.e., an annularly corrugated tube). The corrugated conduit duct body 150(2)

can bend about the bend axis BA-BA and transversely to the lengthwise axis D-D of the duct body 150(2) by bending or flexing at the corrugations.

In some embodiments, the corrugated conduit 150(1) or 150(2) is formed of metal (e.g., galvanized steel).

In some embodiments, the duct body 150 is a tubular, flexible stripwound conduit including a helically wound strip. The stripwound conduit may have an engaged profile or, alternatively, an interlocked profile.

Figure 9:
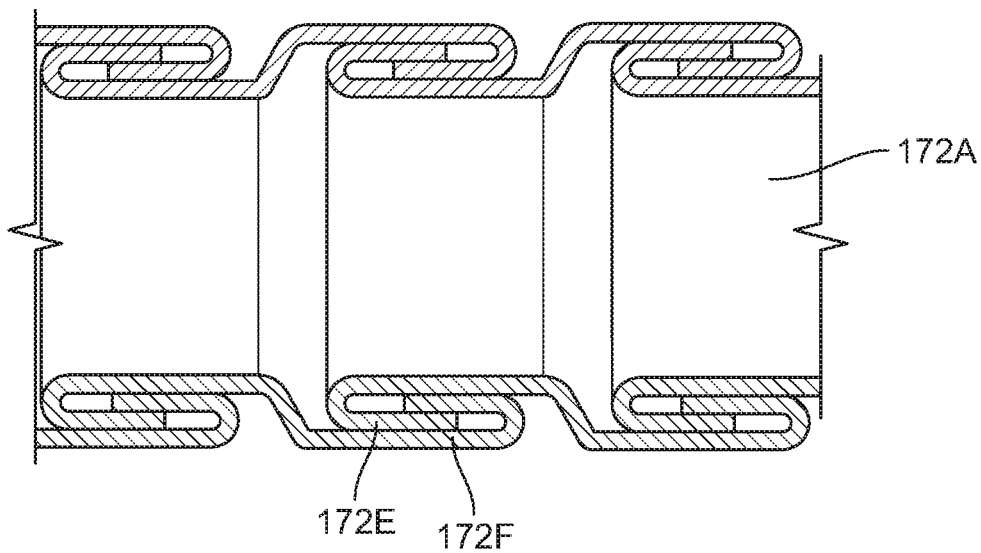
FIG. 9 is a fragmentary, cross-sectional view of an alternative duct body that may be used in pre-expanded cover assembly units according to further embodiments of the present invention.

In some embodiments and with reference with to FIG. 9, the duct body 150 is an engaged stripwound conduit duct body 150(3). The duct body 150(3) includes a helically wound strip 172A and an engaged profile with helical engaged, interlocking strip edges 172E, 172F. The duct body 150(3) can bend about the bend axis BA-BA and transversely to the lengthwise axis D-D of the conduit 150(3) by axially sliding the interlocked edges 172E, 172F relative to one another at the edge joints.

Figure 10:
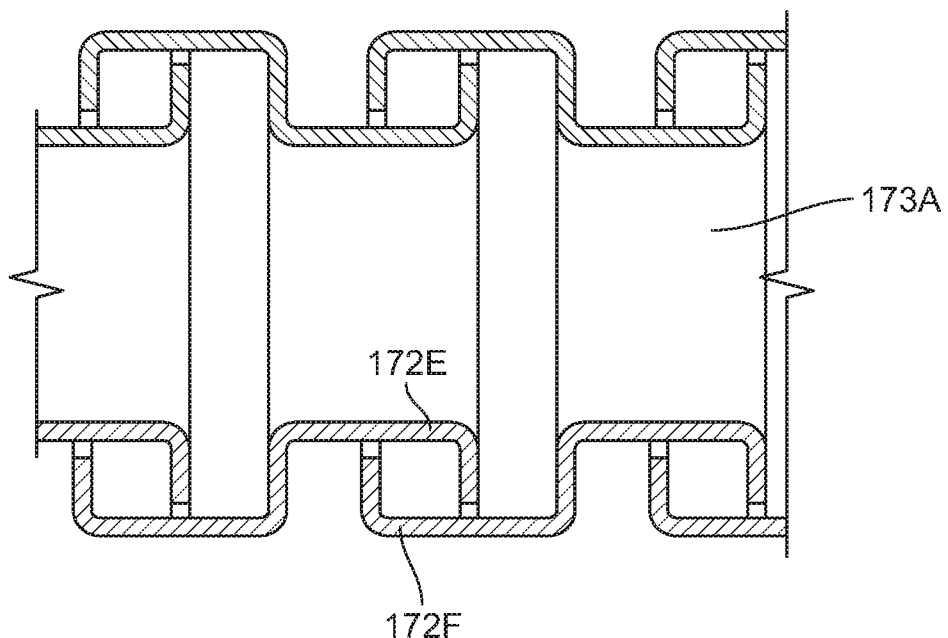
FIG. 10 is a fragmentary, cross-sectional view of an alternative duct body that may be used in pre-expanded cover assembly units according to further embodiments of the present invention.

In some embodiments and with reference with to FIG. 10, the duct body 150 is an interlocked stripwound conduit duct body 150(4). The duct body 150(4) includes a helically wound strip 173A and an interlocked profile with helical interlocked strip edges 173E, 173F. In some embodiments, the strip 173A is formed of metal (e.g., galvanized steel). The duct body 150(4) can bend about the bend axis BA-BA and transversely to the lengthwise axis D-D of the duct body 150(4) by axially sliding the interlocked edges 173E, 173F relative to one another at the edge joints.

In some embodiments, the stripwound conduits 150(3), 150(4) are formed of metal (e.g., galvanized steel).

Thus, in some embodiments, the duct 150 is mechanically constructed such that it can bend or articulate at a plurality of prescribed joints axially distributed along the length of the duct 150. For example, in the case of the corrugated ducts 150(1), 150(2), the corrugations form the prescribed joints and, in the case of the stripwound ducts 150(3), 150(4), the slidably interlocked edges form the prescribed joints.

The geometric shapes and dimensions of the duct bodies 150(1)-(4) as illustrated in FIGS. 7-10 are exemplary and the shapes and dimensions suitable for implementation of the present invention are not limited to the illustrated shapes and dimensions.

According to some embodiments, the bend resistance of the duct body 150 is less than the radial crush resistance of the duct body 150. In some embodiments, the bend resistance of the duct body 150 is in the range of from about 1 to 10 grams, and the radial crush resistance of the duct body 150 is in the range of from about 200 to 1,500 lbs.

Figure 18:
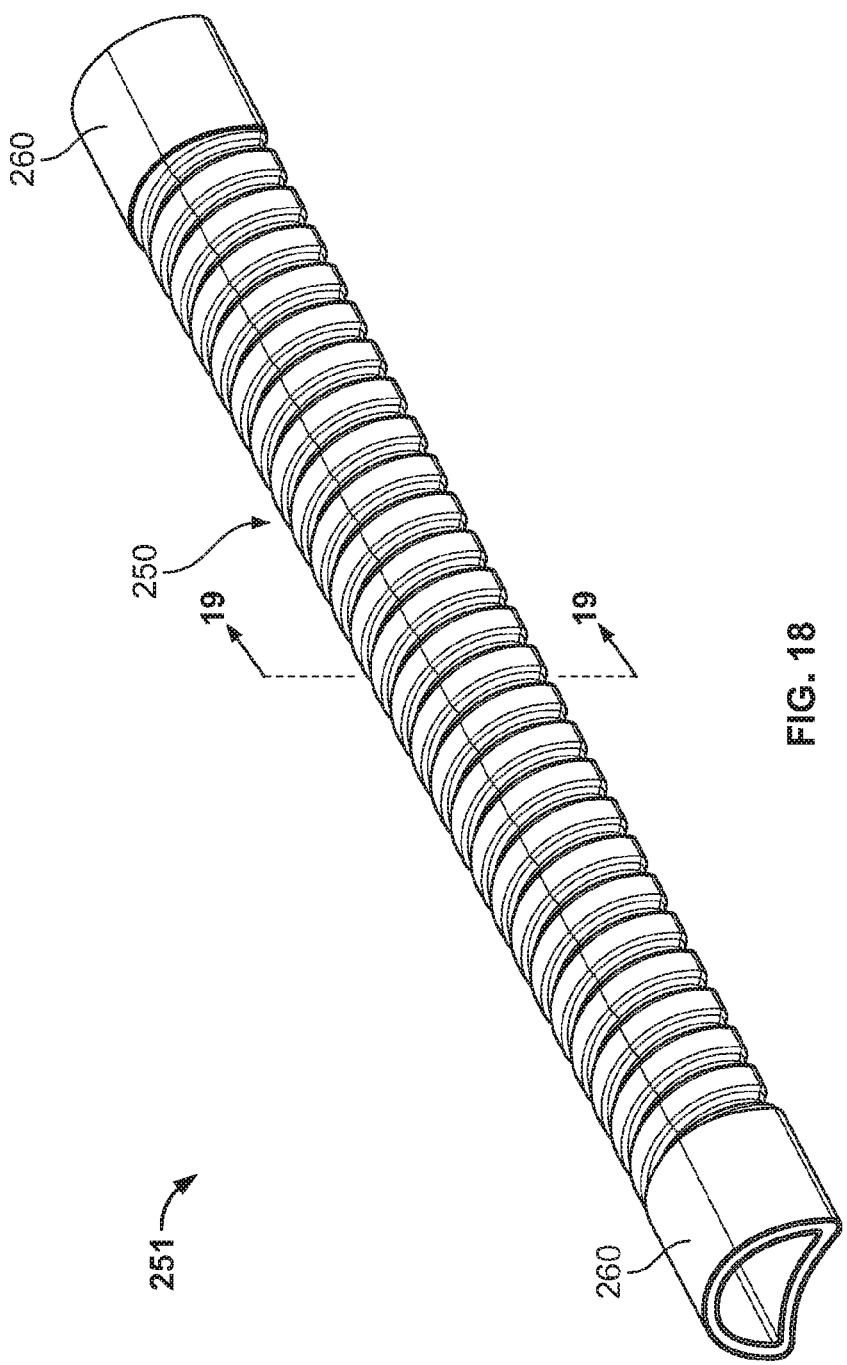
FIG. 18 is a perspective view of a duct according to further embodiments of the present invention.
Figure 19:
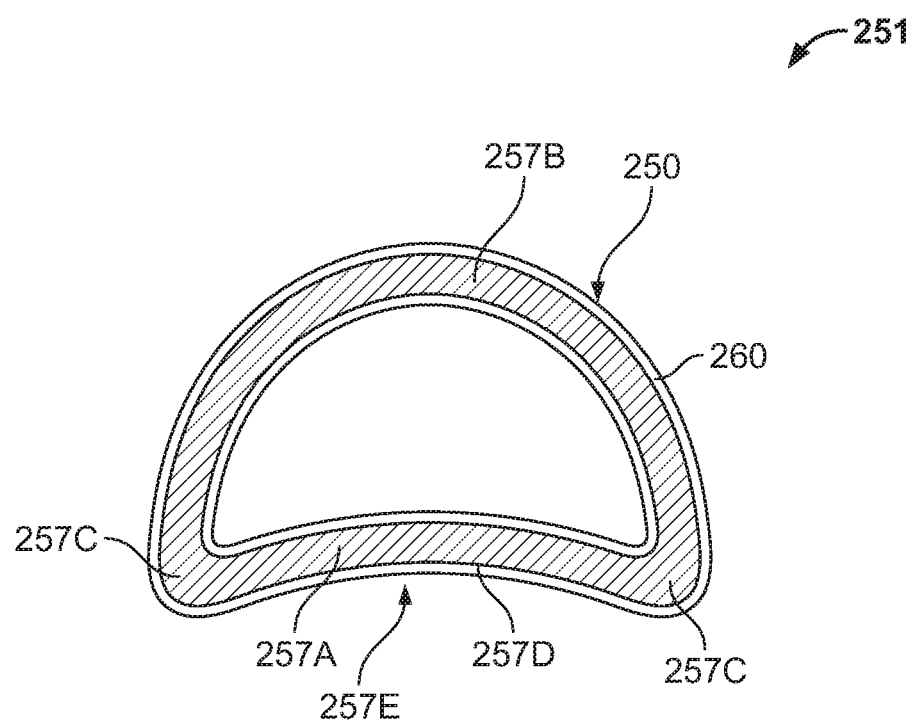
FIG. 19 is a cross-sectional view of the duct of FIG. 18 taken along the line 19-19 of FIG. 18.
Figure 20:
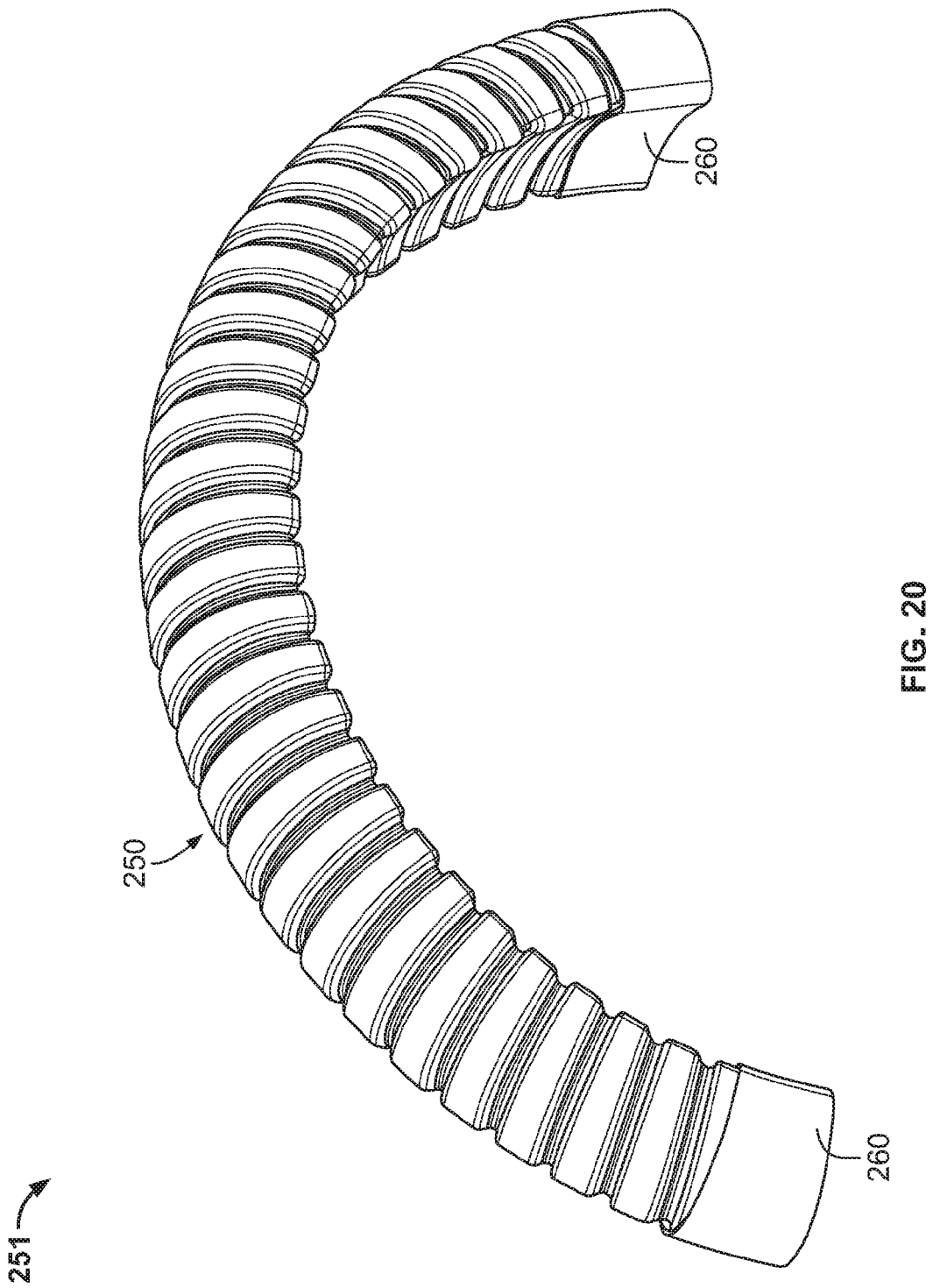
FIG. 20 is a perspective view of the duct of FIG. 18 in a bent configuration.

With reference to FIGS. 18-20, a duct 251 according to further embodiments of the invention is shown therein. The duct 251 can be used in place of the duct 151 in the pre-expanded unit 101. The duct 251 may be constructed and operate in the same manner as the duct 151, except as follows.

The duct 251 includes a duct body 250 corresponding to the duct body 150 and end covers 260 corresponding to the end covers 160.

The duct body 250 includes an outer wall section 257B and an integral inner wall section 257A joined at opposed, axially extending corners 257C.

The duct 251 has a different cross-sectional profile than the duct 151. The duct body 250 is generally D-shaped in cross-section or has a generally semi-circular shape in lateral cross-section (perpendicular to the lengthwise axis D-D. The outer wall section 257B has a convex, arcuate or rounded outer cross-sectional profile. In some embodiments, the arc of the outer wall section 257B extends across from about 160 to 200 degrees.

The outer surface 257D of the inner wall section 257B has a concave, arcuate or rounded profile in cross-section defining a channel 257E. The rounded profile of the outer surface 257D of the wall section 257B may substantially match the curvature of the layer 130. In some embodiments, the arc of the outer surface 257D extends across from about 90 to 180 degrees.

The duct 251 can present a lower profile while still providing the benefits discussed above with regard to the duct 151. The lower profile of the duct 251 can reduce the stresses applied to the outer sleeve 140.

Figure 21:
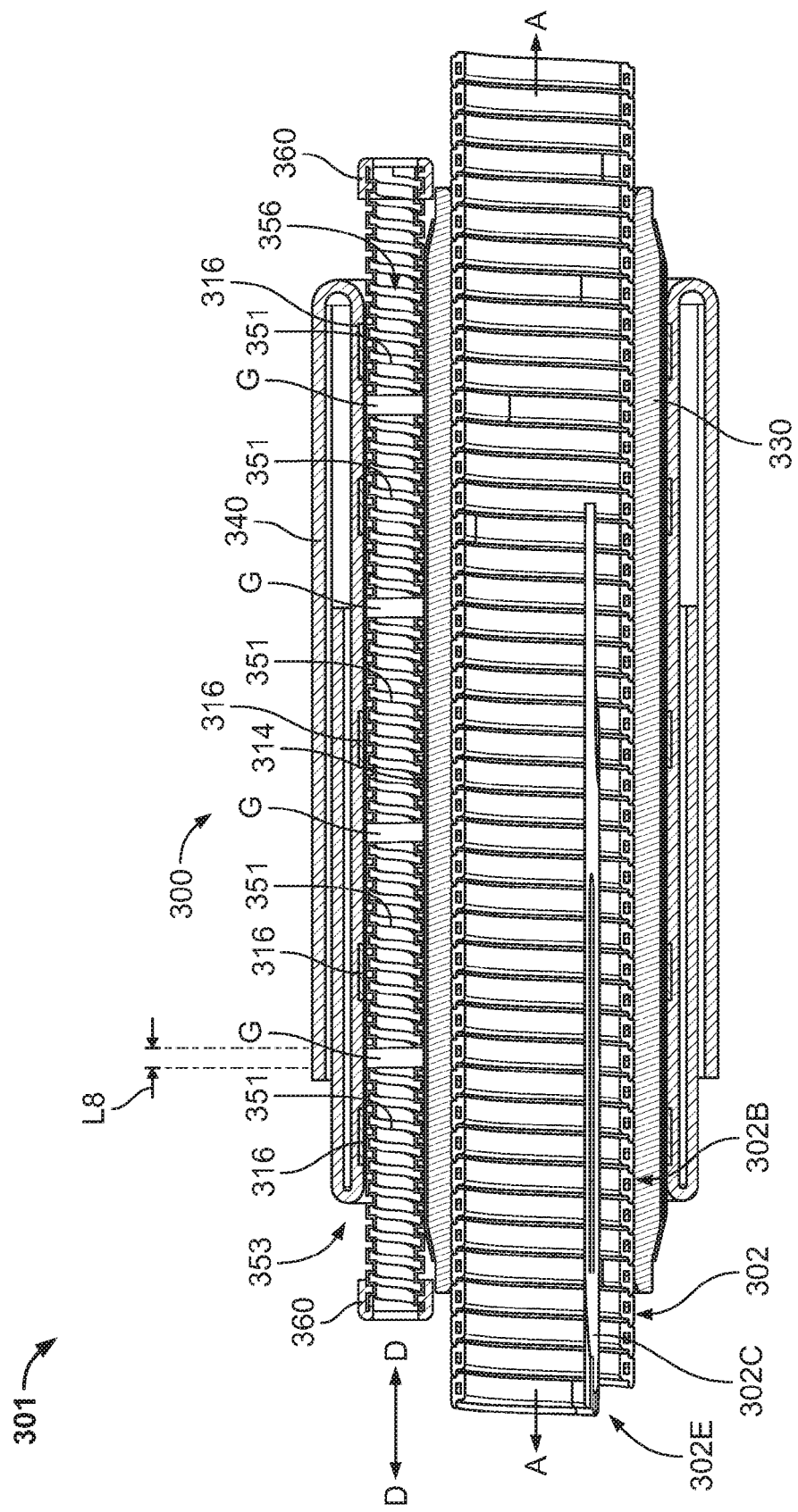
FIG. 21 is a cross-sectional view of a pre-expanded unit including a cover assembly and a holdout device according to further embodiments of the present invention.
Figure 22:
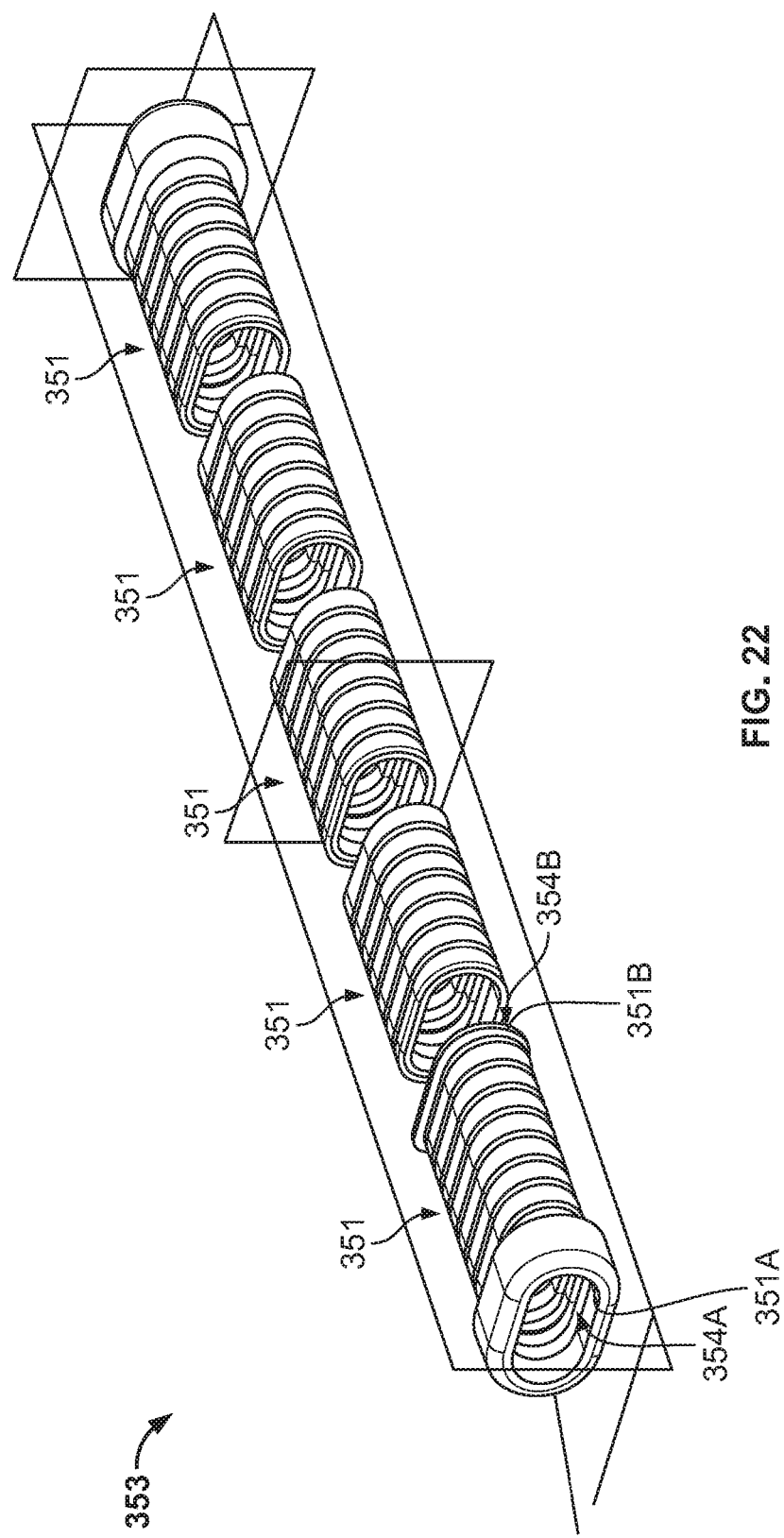
FIG. 22 is a perspective view of a duct system forming a part of the pre-expanded unit of FIG. 21.

With reference to FIGS. 21 and 22, a pre-expanded unit 301 according to further embodiments is shown therein. The unit 301 is constructed and usable in the same manner as the unit 101, except as follows.

The unit 301 includes a duct system 353 in place of the duct 151. The duct system 353 includes a plurality (as shown, five) tubular ducts 351 serially mounted between the copper mesh sleeve 314 and the outer sleeve 340.

Each duct 351 includes a tubular duct sleeve or body 350 and may also include one or a pair of end caps or covers 360 or rounded end edges 362. Each duct 351 has opposed ends 351A, 351B and a lengthwise axis D-D extending substantially parallel to the cover assembly axis A-A. Each duct 351 may be secured to the inner sleeve 330 over the copper mesh 314 by tape wraps 316.

The inner surface of each duct body 351 defines an axially extending neutral conductor through passage 356 terminating at and communicating with opposed and openings 354A, 354B.

In use, the neutral conductors 46 are routed sequentially through the passages 356 of the ducts 351 and connected as described above, before or after removing the holdout 302. As the pull cord 302C is withdrawn and the distal end 302E of the holdout cylinder 302B recedes, each duct 351 that is no longer supported by the holdout cylinder 302B are displaced radially inwardly by the contracting outer sleeve 340 independently of the adjacent duct 351. As a result, the compressive load of the outer sleeve 340 is not transferred to the end of the holdout 302, thereby reducing the force required withdraw the strip.

In some embodiments, in the pre-expanded unit 301 before beginning installation, an axial gap G is defined between the opposing ends 351A, 351B of adjacent ones of the ducts 351. In some embodiments, the length 18 (FIG. 21) of each gap G is in the range of from about zero to 1 inch and in some embodiments, in the range of from about 0.01 to 0.25 inch.

In some embodiments, in the pre-expanded unit 301 before beginning installation, the ducts 351 are disposed in end to end contact (i.e., substantially no gap is defined between the opposing ends 351A, 351B of adjacent ones of the ducts 351).

The ducts 351 may be rigid. In some embodiments some or each of the ducts 351 is flexible as described herein for the ducts 151, 251. The ducts 351 may be formed of metal. The ducts 351 may be formed of corrugated conduit or stripwound conduit as described above for the duct bodies 150(1), 150(2), 150(3), 150(4). The ducts 351 may have a stadium cross-sectional profile (as described for the duct 151), a D-shaped profile (as described for the duct 251), or other suitable configuration. The ducts 351 may be differently constructed from one another.

There may be more or fewer than five ducts 351 in the duct system 353. In some embodiments, the duct system 351 includes from about 2 to 3 ducts 351 and, in some embodiments, from about 3 to 12 ducts.

In some embodiments, the end covers 160, 260, 360 may be replaced with smooth or rounded edges that are molded or machined into the material of the duct body (e.g., the duct bodies 150, 250, 350).

While in the embodiments shown in the drawings the neutral conductors are wires, according to further embodiments the neutral conductors may take other shapes or configurations such as one or more flat tapes. In some embodiments, an elongate jumper or extension conductor is provided that is clamped or otherwise secured in electrical contact with the cable neutral conductors (e.g., flat copper tapes) on either side of the splice and is routed through the duct (e.g., the duct 151) as described herein. In this case, the jumper conductor constitutes a neutral conductor and is an extension of the neutral conductor of at least one of the spliced cables. The jumper conductor may be a braided copper mesh or sock, for example.

Cover assemblies according to some embodiments of the present invention may include additional layers and/or certain layers may be omitted. For example, cover assemblies in accordance with some embodiments of the present invention may be formed without the semiconductor layer 139. One or more additional layers may be interposed between the inner sleeve 130 and the outer sleeve 140.

Cover assemblies and ducts according to embodiments of the invention may be used for any suitable cables and connections. Such cable assemblies may be adapted for use, for example, with connections of medium voltage cables up to about 46 kV. In some applications, the cover assemblies or ducts are installed on underground residential distribution (URD) cable splices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An integral, unitary pre-expanded cover assembly unit for covering an electrical connection between first and second electrical cables each having a primary conductor and a neutral conductor, the pre-expanded cover assembly unit comprising:
    a cover assembly including:
        an elastomeric inner sleeve defining a cable passage to receive the electrical connection and the primary conductors of the first and second cables;
        an elastomeric outer sleeve surrounding the inner sleeve; and
        a duct interposed radially between the inner and outer sleeves, the duct defining a duct passage configured to receive at least one of the neutral conductors therethrough; and
    a removable holdout mounted within the inner sleeve, wherein the holdout is operative to maintain the inner sleeve in an expanded state and the outer sleeve in an expanded state, and is removable from within the inner sleeve to permit the inner sleeve and the outer sleeve to contract radially inwardly;
    wherein:
        the duct is flexible; and
        the duct is operative to resist radial collapse of the duct and to bend radially inwardly as the holdout is axially removed from the inner sleeve.

2. The pre-expanded cover assembly unit of claim 1 wherein the holdout includes a tubular holdout body formed from a helically wound strip, and the holdout is removable from the inner sleeve by pulling the strip.

3. The pre-expanded cover assembly unit of claim 1 wherein the duct includes a plurality of prescribed bending joints.

4. The pre-expanded cover assembly unit of claim 1 wherein the duct is formed of metal.

5. The pre-expanded cover assembly unit of claim 4 wherein the duct includes a metal, flexible, stripwound conduit.

6. The pre-expanded cover assembly unit of claim 4 wherein the duct includes a metal, flexible, corrugated conduit.

7. The pre-expanded cover assembly unit of claim 4 wherein the duct includes:
    a metal, tubular duct body having opposed end edges; and
    end covers covering the end edges.

8. The pre-expanded cover assembly unit of claim 1 wherein the duct is formed of an electrically conductive polymeric material.

9. The pre-expanded cover assembly unit of claim 1 wherein the duct is secured to the inner sleeve by a band or tape.

10. The pre-expanded cover assembly unit of claim 1 wherein the duct includes a substantially concave bottom wall facing the inner sleeve.

11. The pre-expanded cover assembly unit of claim 1 wherein the duct includes a substantially convex top wall facing the outer sleeve.

12. The pre-expanded cover assembly unit of claim 1 wherein:
    the outer sleeve is formed of ethylene propylene diene monomer (EPDM) rubber;
    the inner sleeve is formed of silicone rubber;
    the cover assembly includes a Faraday cage sleeve mounted within the inner sleeve and formed of an electrically conductive elastomer;
    the cover assembly includes a stress cone sleeve mounted within the inner sleeve proximate an end thereof, wherein the stress cone sleeve is formed of an electrically conductive elastomer; and
    the cover assembly includes a semiconductor layer mounted on an outer side of the inner sleeve.

13. The pre-expanded cover assembly unit of claim 1 wherein the cover assembly is a cold shrinkable cover assembly.

14. The pre-expanded cover assembly unit of claim 1 wherein:
    the cover assembly extends along a lengthwise axis from a cover first end to a cover second end; and
    the outer sleeve and the duct each extend lengthwise and have a respective first end proximate the cover first end and a respective second end proximate the cover second end.

15. The pre-expanded cover assembly of claim 1 wherein:
    the cover assembly has a cover assembly lengthwise axis;

the duct has a duct lengthwise axis that extends substantially parallel to the cover assembly lengthwise axis; and the duct is configured to bend about a primary bend axis that is transverse to the duct lengthwise axis.

16. A method for forming a connection assembly, the method comprising:

forming an electrical connection between first and second electrical cables, the first and second cables each including a primary conductor and at least one neutral conductor;

providing an integral, unitary pre-expanded cover assembly unit including:
a cover assembly including:
an elastomeric inner sleeve defining a cable passage to receive the electrical connection and the primary conductors of the first and second cables;
an elastomeric outer sleeve surrounding the inner sleeve; and
a duct interposed radially between the inner and outer sleeves, the duct defining a duct passage configured to receive at least one of the neutral conductors therethrough; and
a removable holdout mounted within the inner sleeve, wherein the holdout is operative to temporarily maintain the inner sleeve in an expanded state and the outer sleeve in an expanded state, and is removable from within the inner sleeve to permit the inner sleeve and the outer sleeve to contract radially inwardly;
wherein:
the duct is flexible; and
the duct is operative to resist radial collapse of the duct and to bend radially inwardly as the holdout is axially removed from the inner sleeve;

mounting the cover assembly on the cables such that the electrical connection and the primary conductors of the first and second cables extend through the cable passage;

inserting the at least one neutral conductor of the first cable through the duct passage;

axially removing the holdout from the inner sleeve such that duct bends radially inwardly as the holdout is removed; and coupling the at least one neutral conductor of the first cable with the at least one neutral conductor of the second cable.

17. The method of claim 16 wherein:
the holdout includes a tubular holdout body formed from a helically wound strip; and
axially removing the holdout from inner sleeve includes pulling the strip such that the tubular holdout body progressively disintegrates.

18. The method of claim 16 wherein:
the cover assembly has a cover assembly lengthwise axis;
the duct has a duct lengthwise axis that extends substantially parallel to the cover assembly lengthwise axis; and
as the holdout is axially removed from the inner sleeve, the outer sleeve exerts a radially compressive load on the duct that causes the duct to bend about a primary bend axis that is transverse to the duct lengthwise axis.

19. An integral, unitary cover assembly for covering an electrical connection between first and second electrical cables each having a primary conductor and a neutral conductor, the cover assembly comprising:

an elastomeric inner sleeve having a sleeve axis and an inner surface defining a cable passage to receive the electrical connection and the primary conductors of the first and second cables;

an elastomeric outer sleeve surrounding the inner sleeve; and a duct system including a plurality of ducts disposed in series and interposed radially between the inner and outer sleeves, wherein each of the ducts has a lengthwise axis extending substantially parallel to the sleeve axis, the ducts are arranged serially in end-to-end alignment, and each of the ducts defines a duct passage configured to receive at least one of the neutral conductors therethrough.

20. The cover assembly of claim 19 further including a removable holdout mounted within the inner sleeve to form a pre-expanded cover assembly unit, wherein the holdout is operative to temporarily maintain the inner sleeve in an expanded state and the outer sleeve in an expanded state, and is removable from within the inner sleeve to permit the inner sleeve and the outer sleeve to contract radially inwardly.

21. The cover assembly of claim 19 wherein the duct system includes gaps defined between adjacent ends of the ducts.

22. The cover assembly of claim 19 wherein the duct system is configured such that substantially no gaps are defined between adjacent ends of the ducts.

23. A method for forming a connection assembly, the method comprising:

forming an electrical connection between first and second electrical cables, the first and second cables each including a primary conductor and at least one neutral conductor;

providing an integral, unitary cover assembly including:
an elastomeric inner sleeve having a sleeve axis and an inner surface defining a cable passage to receive the electrical connection and the primary conductors of the first and second cables;
an elastomeric outer sleeve surrounding the inner sleeve; and
a duct system including a plurality of ducts disposed in series and interposed radially between the inner and outer sleeves, wherein each of the ducts has a lengthwise axis extending substantially parallel to the sleeve axis, the ducts are arranged serially in end-to-end alignment, and each of the ducts defines a duct passage configured to receive at least one of the neutral conductors therethrough;

mounting the cover assembly on the cables such that the electrical connection and the primary conductors of the first and second cables extend through the cable passage;

inserting the at least one neutral conductor of the first cable through the duct passages of the ducts; and coupling the at least one neutral conductor of the first cable with the at least one neutral conductor of the second cable.

24. The method of claim 23 including:
providing the cover assembly as a pre-expanded cover assembly unit including a removable holdout mounted within the inner sleeve, wherein the holdout is operative to maintain the inner sleeve in an expanded state and the outer sleeve in an expanded state; and
further including the step of removing the holdout from the inner sleeve to permit the inner sleeve and the outer sleeve to contract radially inwardly.

* * * * *

UNITED STATES PATENT AND TRADEMARK OFFICE
CERTIFICATE OF CORRECTION

PATENT NO. : 10,236,673 B2
APPLICATION NO. : 15/722507
DATED : March 19, 2019
INVENTOR(S) : Kumar et al.

Page 1 of 1

It is certified that error appears in the above-identified patent and that said Letters Patent is hereby corrected as shown below:

In the Claims

Column 17, Claim 16, Lines 26-27:
Please correct "operative to temporarily maintain" to read -- operative to maintain --

Column 18, Claim 20, Line 17:
Please correct "operative to temporarily maintain" to read -- operative to maintain --

Signed and Sealed this
Second Day of July, 2019

Andrei Iancu
*Director of the United States Patent and Trademark Office*